US010416954B2

(12) United States Patent
Edry et al.

(10) Patent No.: US 10,416,954 B2
(45) Date of Patent: Sep. 17, 2019

(54) STREAMING OF AUGMENTED/VIRTUAL REALITY SPATIAL AUDIO/VIDEO

(71) Applicant: Microsoft Technology Licensing, LLC, Redmond, WA (US)

(72) Inventors: Philip Andrew Edry, Seattle, WA (US); Todd Ryun Manion, Seattle, WA (US); Chinweizu Uzodinma Owunwanne, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/582,461

(22) Filed: Apr. 28, 2017

(65) Prior Publication Data

US 2018/0314486 A1 Nov. 1, 2018

(51) Int. Cl.
| | | |
|---|---|---|
| *G06F 17/00* | (2019.01) | |
| *G06F 3/16* | (2006.01) | |
| *H04N 19/40* | (2014.01) | |
| *H04S 7/00* | (2006.01) | |
| *G06F 3/14* | (2006.01) | |
| *G09G 5/00* | (2006.01) | |
| *A63F 13/25* | (2014.01) | |
| *A63F 13/50* | (2014.01) | |

(52) U.S. Cl.
CPC ............. *G06F 3/165* (2013.01); *A63F 13/25* (2014.09); *A63F 13/50* (2014.09); *G06F 3/14* (2013.01); *G09G 5/006* (2013.01); *H04N 19/40* (2014.11); *H04S 7/30* (2013.01); *G09G 2370/04* (2013.01); *H04S 2400/11* (2013.01); *H04S 2420/01* (2013.01); *H04S 2420/11* (2013.01)

(58) Field of Classification Search
CPC ... G10L 19/008; G10L 19/20; H04S 2420/01; H04S 3/008; H04R 5/04
See application file for complete search history.

(56) References Cited

U.S. PATENT DOCUMENTS

| | | |
|---|---|---|
| 7,966,191 B2 | 6/2011 | Schuijers et al. |
| 8,872,894 B2 | 10/2014 | Pomeroy |

(Continued)

FOREIGN PATENT DOCUMENTS

| | | |
|---|---|---|
| WO | 2009073830 A1 | 6/2009 |
| WO | 2015126643 A2 | 8/2015 |

OTHER PUBLICATIONS

Lufkin, Bryan, "You Can Now Watch 360-Degree Video on Your TV", http://gizmodo.com/you-can-now-watch-360-degree-video-on-your-tv-1749304450, Published on: Dec. 22, 2015, 2 pages.

(Continued)

*Primary Examiner* — Thomas H Maung

(57) ABSTRACT

A system for streaming spatial audio and video is provided. In response to a request to share a virtual reality session, a characteristic of a second audio output device and a characteristic of a second video output device can be determined. Further in response to the request, based on the determined characteristic of the second audio output device, spatial audio can be provided to the second audio output device and received virtual reality video can be transcoded based on the determined characteristic of the second video output device. The transcoded virtual reality video can be provided to the second video output device so that other(s) can experience the virtual reality session.

10 Claims, 9 Drawing Sheets

(56) References Cited

U.S. PATENT DOCUMENTS

| | | | |
|---|---|---|---|
| 9,332,370 B2 | 5/2016 | Zajac et al. | |
| 2012/0303834 A1 | 11/2012 | Adam et al. | |
| 2013/0010058 A1* | 1/2013 | Pomeroy | H04N 13/0029 |
| | | | 348/43 |
| 2015/0243078 A1* | 8/2015 | Watson | G02B 27/2228 |
| | | | 345/547 |
| 2015/0358715 A1* | 12/2015 | Macours | H04R 1/1041 |
| | | | 381/74 |
| 2018/0046431 A1* | 2/2018 | Thagadur Shivappa | ...... |
| | | | G06F 3/165 |

OTHER PUBLICATIONS

Fugal, et al., "Spatial audio—bringing realistic sound to 360 video", https://code.facebook.com/posts/412047759146896/spatial-audio-bringing-realistic-sound-to-360-video/, Published on: Feb. 22, 2017, 9 pages.

Cohen, David, "YouTube Adds 360-Degree Live Streaming, Spatial Audio", http://www.adweek.com/digital/youtube-360-degree-live-streaming-spatial-audio/, Published on: Apr. 18, 2016, 9 pages.

"Audio Spatializer SDK", http://web.archive.org/web/20160227061641/http:/docs.unity3d.com:80/Manual/AudioSpatializerSDK.html, Published on: Apr. 4, 2012, 6 pages.

"360 Degree Video Format and Audio for VR Video", https://www.macxdvd.com/online-video/360-video-format-vr-audio.htm, Retrieved on: Apr. 18, 2017, 2 pages.

"Use spatial audio in 360-degree and VR videos", https://support.google.com/youtube/answer/6395969?co=GENIE.Plafform%3DAndroid&hl=en&oco=1, Retrieved on: Apr. 18, 2017, 2 pages.

"Dolby Atmos for Headphones", https://www.dolby.com/in/en/technologies/mobile/dolby-atmos.html, Retrieved on: Apr. 18, 2017, 4 pages.

"360° VR Video", https://www.harmonicinc.com/media/2017/01/Harmonic_SB_VR-Video.pdf, Published on: Jan. 2017, 5 pages.

Tashev, et al., "Spatial Audio", https://www.microsoft.com/en-us/research/project/spatial-audio/, Published on: Dec. 1, 2015, 6 pages.

"International Search Report & Written Opinion for PCT Patent Application No. PCT/US18/026643", dated Jun. 7, 2018, 12 Pages.

* cited by examiner

STREAMING OF AUGMENTED/VIRTUAL REALITY SPATIAL AUDIO/VIDEO

BACKGROUND

Some streaming video platforms, such as Twitch, provide services that focus on video gaming, including playthroughs of video games, broadcasts of eSports competitions, and other events. Such platforms also share creative content, and more recently, music broadcasts. In some existing systems, there are two types of users: participants and spectators. Participants of the system can control aspects of a session defining an event. For example, data defining a session can enable participants to control avatars in a virtual reality environment and enable the participation in tournaments, games, or other forms of competition. The participants can interact with objects in the virtual reality environment, including objects controlled by other participants, etc. Content of such events can either be streamed to spectators in real time or via video on demand.

It is with respect to these and other considerations that the disclosure made herein is presented.

SUMMARY

Described herein is a system for streaming spatial audio and video, comprising a processor and a computer-readable storage medium in communication with the processor. The computer-readable storage medium has computer-executable instructions stored thereupon which, when executed by the processor, cause the processor to receive a request to share a virtual reality session, determine a characteristic of a second audio output device, and, determine a characteristic of a second video output device. The computer-readable storage medium has further computer-executable instructions stored thereupon which, when executed by the processor, cause the processor to, in response to the request, based on the determined characteristic of the second audio output device, provide spatial audio to the second audio output device; in response to the request, transcode received virtual reality video based on the determined characteristic of the second video output device; and, provide the transcoded virtual reality video to the second video output device.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
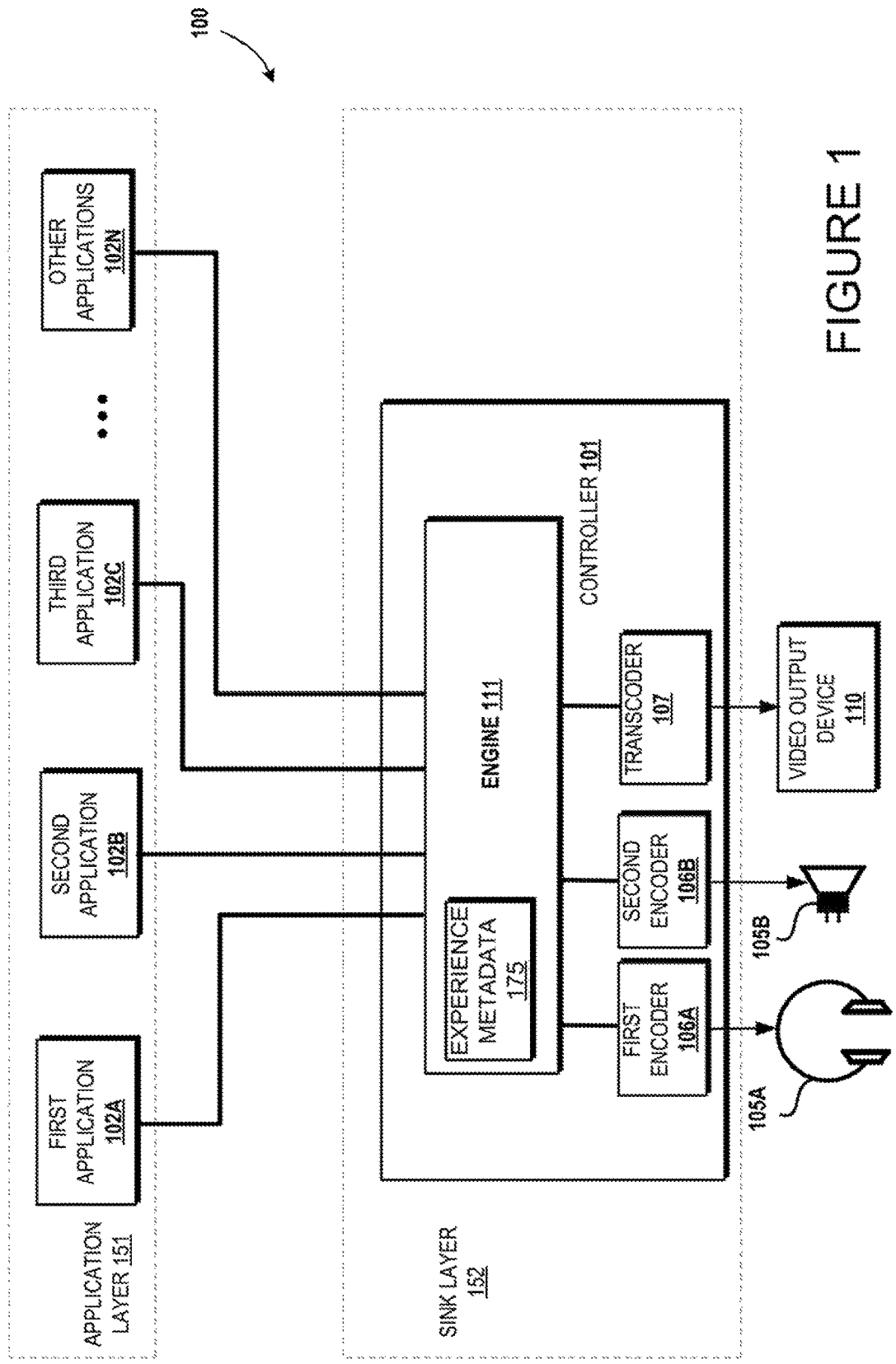
FIG. 1 illustrates an example system for streaming of spatial audio and video.

The following Detailed Description discloses techniques and technologies pertaining to sharing audio/video of an augmented/virtual reality session. Aspects of the subject disclosure pertain to the technical problem of other(s) being unable to experience an augmented and/or virtual reality session of a user. The technical features associated with addressing this problem involve receiving a request to share (e.g., cast) spatial audio and/or video associated with an augmented and/or virtual reality session, transcoding a spatial video stream to a video output device, translating a spatial audio stream based upon an output configuration of a second audio output device, simultaneously generating outputs to the augmented and/or virtual reality device, the video output device and the second audio output device. Accordingly, aspects of these technical features exhibit technical effects of allowing more than a single user to simultaneously experience an augmented and/or virtual reality session.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a device may be improved as the use of the techniques disclosed herein enable a user to hear audio generated audio signals as they are intended. In addition, improved human interaction improves other computing resources such as processor and network resources. Other technical effects other than those mentioned herein can also be realized from implementations of the technologies disclosed herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling a shared three-dimensional audio bed. As will be described in more detail below with respect to FIG. 9, there are a number of applications and modules that can embody the functionality and techniques described herein.

Referring to FIG. 1, a system for streaming of spatial audio and video 100 is illustrated. The system 100 comprises a controller 101 executing at a sink layer 152 for storing, communicating, and processing the audio and video data described herein. The controller 101 comprises an engine 111 configured to provide information to a first encoder 106A and, selectively based upon experience metadata 175, to a second encoder 106B to stream spatial audio. The engine is further configured to, selectively based upon experience metadata 175, provide information to a transcoder 107 to transcode spatial video.

The first encoder 106A is associated with a first audio output device 105A (e.g., augmented/virtual reality head set) and the second encoder 106B is associated with a second audio output device 106A (e.g., room speaker(s)). The first encoder 106A and the second encoder 106B are sometimes collectively referred to as "the encoders 106" and the first audio output device 105A and the second audio output device 105B are sometimes collectively referred to as "the audio output devices 105". This example system 100 is provided for illustrative purposes and is not to be construed as limiting. It can be appreciated that the system 100 can include fewer or more components than those shown in FIG. 1.

The encoders 106 are configured to process channel-based audio, spherical audio and/or object-based audio according to one or more selected audio spatialization technologies. A rendered stream generated by an encoder 106 can be communicated to one or more output devices 105. Examples of an output device 105, also referred to herein as an "endpoint device," include, but are not limited to, speaker systems and headphones (e.g., augmented and/or virtual reality enabled). An encoder 106 and/or an output device 105 can be configured to utilize one or more audio spatialization technologies such as Dolby Atmos, HRTF, etc.

The encoders 106 can also implement other functionality, such as one or more echo cancellation technologies. Such technologies are beneficial to select and utilize outside of the application environment, as individual applications do not have any context of other applications, thus can't determine when echo cancelation and other like technologies should be utilized.

In one embodiment, one or more of the encoders 106 can transcode streaming spatial audio based on an audio spatialization technology into different audio spatialization technology. For example, one or more of the encoders 106 can transcode object-based audio received from a particular application 102 into an Ambisonics output (e.g., first-order, higher-order, mixed-order, etc.) which is then provided to output device(s) 105.

The system 100 can stream spatial audio utilizing one or more audio spatialization technology(ies), for example, spherical sound representation such as Ambisonics output (e.g., first-order, higher-order, mixed-order, etc.), object-based audio output, channel-based output and/or any other type of suitable audio output.

Generally described, audio output data based on the Ambisonics technology involves a full-sphere surround sound technique. In addition to the horizontal plane, the output data covers sound sources above and below the listener. Thus, in addition to defining a number of other properties for each stream, each stream is associated with a location defined by a three-dimensional coordinate system.

An audio output based on the Ambisonics technology can contain a speaker-independent representation of a sound field called the B-format, which is configured to be decoded by a listener's (spectator or participant) audio output device. This configuration allows the system 100 to record data in terms of source directions rather than loudspeaker positions, and offers the listener a considerable degree of flexibility as to the layout and number of speakers used for playback. The B-format is a first-order Ambisonics output.

Higher-order Ambisonics refers to a higher resolution audio output in which additional groups of directional components are added to the B-format (e.g., $2^{nd}$ order, $3^{rd}$ order . . . $N^{th}$ order). The higher resolution generally consumes greater bandwidth as the additional directional components are added. For example, $2^{nd}$ order Ambisonics employs eight components, $3^{rd}$ order Ambisonics employs sixteen components, etc. In order to selectively reduce the additional directional components while maintaining the added benefits of higher-order Ambisonics, mixed-order Ambisonics can selectively remove (e.g., zero-out and/or not transmit, by agreement), directional component(s) of higher-order Ambisonics. For example, directional component(s) having value(s) below a threshold level can be removed to reduce bandwidth consumption.

Object-based audio defines objects that are associated with an audio track. For instance, in a movie, a gunshot can be one object and a person's scream can be another object. Each object can also have an associated position. Metadata of the object-based audio enables applications to specify where each sound object originates and how it should move.

With channel-based output individual channels are associated with objects. For instance, a Dolby 5.1 signal includes multiple channels of audio and each channel can be associated with one or more positions. Metadata can define one or more positions associated with individual channels of a channel-based audio signal.

For illustrative purposes, some example applications 102 are individually referred to herein as a first application 102A, a second application 102B, and a third application 102C. Individual applications 102 can also comprise one or more preprocessors for executing code configured to perform the techniques disclosed herein.

The applications 102 can comprise any executable code configured to process object-based audio (also referred to herein as "3D object audio"), channel-based audio (also referred to herein as "2D bed audio") and/or spherical sound representation. Examples of the applications 102 can include but, are not limited to, a media player, a web browser, a video game, a virtual reality application, and a communications application. The applications 102 can also include components of an operating system that generate system sounds.

In addition to providing functionality for interacting with a user, the applications 102 can apply one or more operations to object-based audio, including, but not limited to, one or more folding operations and co-location operations, which can involve combining multiple objects into a single object based, for example, upon experience metadata 175 provided by the engine 111. In another example, the applications 102 can utilize one or more culling operations, which can involve the elimination of one or more selected audio objects.

The applications 102 can generate 3D audio data in accordance with the experience metadata 175. In one illustrative example, if the first application 102A is a video game generating raw object-based audio data having 300 audio objects, and the experience metadata 175 specifies an output device 105B having 10 speakers at specific locations of a three-dimensional area, the application 102A can process the 300 audio objects, e.g. fold, co-locate, and/or filter the objects, to appropriately associate individual or combined audio streams of the raw audio data with the 10 speakers and their respective locations. The applications 102 can generate 3D audio data containing the audio data and other definitions associating audio streams with one or more speaker objects.

In some configurations, the system 100 can translate between a first spatialization technology and a second spatialization technology based on one or more actions. For instance, if a user of the system 100 is rendering audio under HRTF and a virtual reality video stream using a first output device 105A (e.g., using an augmented and/or virtual reality enabled headset) and the user desires to share the augmented and/or virtual reality experience with other(s) (e.g., located in same physical room with the user), the user can notify the system 100 via experience metadata 175. In response to this notification, the system 100 can stream (e.g., simultaneously) the audio to the user using HRTF spatialization technology and translate the stream into another spatialization format such as Dolby Atmos for a speaker system for the other(s) to experience via the second audio output device 105B.

The system 100 can further simultaneously provide a virtual reality video stream to the first output device 105A (e.g., for viewing by the user) and transcode the virtual reality video to a 360 degree video stream using the transcoder 107. The transcoder 107 can then provide a 360 degree video stream to a video output device 110 (e.g., television, display, etc.) for the other(s) to experience the augmented and/or virtual reality session.

With continued reference to FIG. 1, the engine 111 can utilize experience metadata 175 to dynamically determine when and/or how to translate a virtual reality audio/video stream for listening/viewing by other(s). Based upon the experience metadata 175, the engine 1111 can select encoder(s) 106 to stream spatial audio to output device(s) 105. The selected encoder(s) 106 can then transmit audio received from application(s) 102 to output devices 105.

In one embodiment, the experience metadata 175 can include an indication of a user's notification to share the audio video stream. In one embodiment, the experience metadata 175 identifies a particular audio spatialization technology(ies) (e.g., Ambisonics, object-based audio, channel-based, etc.) and associated audio resolution to be utilized in providing an audio stream to the first output device 105A and/or the second output device 105B. Based upon the experience metadata 175, the engine 111 can determine particular encoder(s) 106 to transmit the audio to the first output device 105A and/or the second output device 106B.

Figure 2:
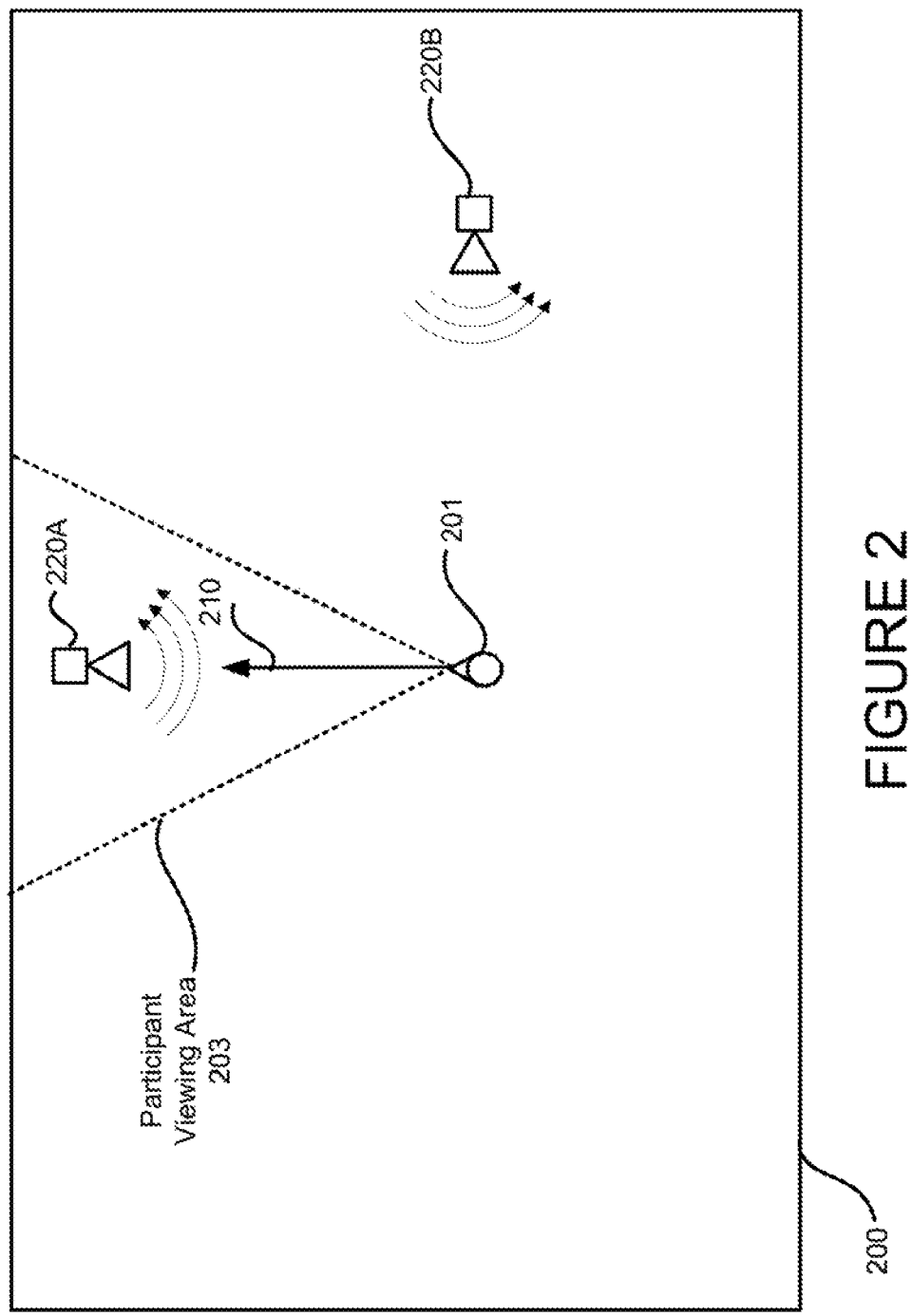
FIG. 2 illustrates a scenario where a computer is managing a virtual reality environment that is displayed on a user interface.

FIG. 2 illustrates a scenario where a computer is managing a virtual reality environment that is displayed on a user interface 200. The virtual reality environment comprises a participant object 201, also referred to herein as an "avatar," that is controlled by a participant. The participant object 201 can move through the virtual reality environment following a path. A system provides a participant viewing area 203. More specifically, the participant object 201 is pointing in a first direction 210.

Also shown in FIG. 2, within the virtual reality environment, a first object 220A and a second object 220B (collectively referred to herein as objects 220) are respectively positioned in front of and the right side of the participant object 201. In such an example, data defining the location of the first audio object 220A can cause a system to render an audio signal of a stream that indicates the location of the first object 220A. In addition, data defining the location of the second audio object 220B would cause a system to render an audio signal that indicates the location of the second audio object 220B. More specifically, in this example, the participant and other(s) would both hear the stream associated with the first audio object 220A, the others(s) from a speaker in front of the other(s) and the participant from the augmented/virtual reality head set. The participant and the other(s) would also hear the stream associated with the second audio object 120B, the other(s) from a speaker on their right and the participant from the augmented/virtual reality head set.

In some configurations, data indicating the direction of a stream can be used to influence how a stream is rendered to a speaker. For instance, in FIG. 2, the stream associated with the second audio object 220B could be directed away from the participant object 201, and in such a scenario, an output of a speaker may include effects, such as an echoing effect or a reverb effect to indicate that direction.

With respect to the scenario 200 of FIG. 2, based upon notification from a user to share the augmented and/or virtual reality experience with other(s), the system 100 can simultaneously stream the audio to the user (e.g., using HRTF spatialization technology) and translate the stream into another spatialization form (e.g., Dolby Atmos) for the second audio output device 105B (e.g, a speaker system) for the other(s) to experience the augmented and/or virtual reality experience.

The system 100 can further transcode the virtual reality video to a 360 degree video stream via the transcoder 107. The transcoder 107 can provide the transcoded virtual reality video to the video output device 110. For example, the transcoder 107 can provide a virtual reality video to the other(s) substantially similar to the participant viewing area 203 viewable by the user.

In response to head movement of the user (e.g., via a head tracker associated with the first audio output device 105A), the audio and video stream experienced by the user can be changed. If the augmented and/or virtual reality experience is being shared with other(s), the system 100 can cause the audio and video streams provided the second audio output device 105B and the video output device 110 (e.g., available to the other(s)) to be changed in correspondence with the audio and video stream experienced by the user.

Figure 3:
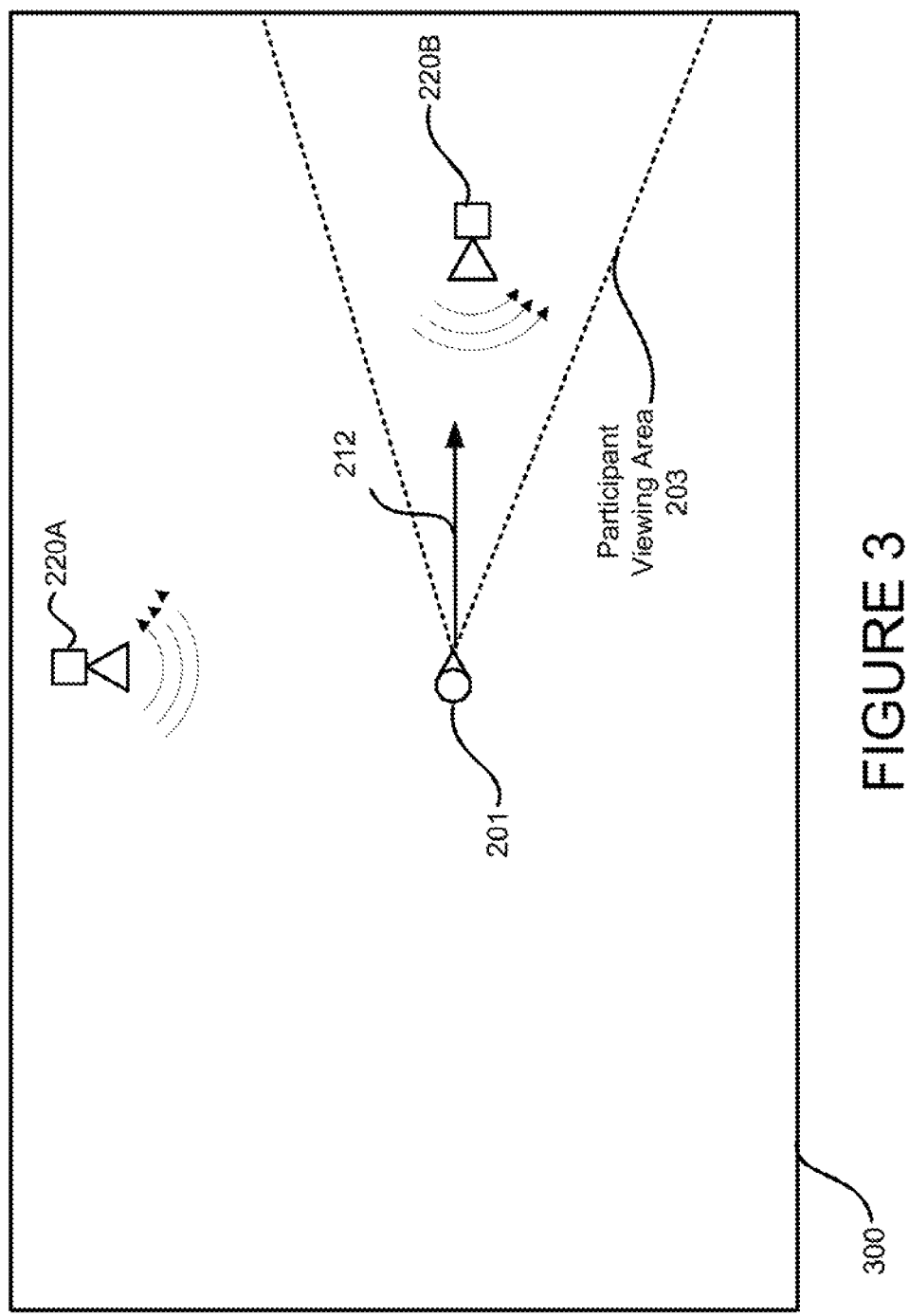
FIG. 3 illustrates a scenario where a computer is managing a virtual reality environment that is displayed on a user interface.

Referring briefly to FIG. 3, the participant object 201 is pointing in a second direction 212 such that the second object 220B is visible within the participant viewing area 203. The system 100 causes sounds emanating from the second 220B to indicate the location of the second object 220B as being in front of the user and other(s), in a shared experience. The system 100 further causes the video displayed to the user and the other(s), in a shared experience, to include the second object 220B within the participant viewing area 203.

Figure 4:
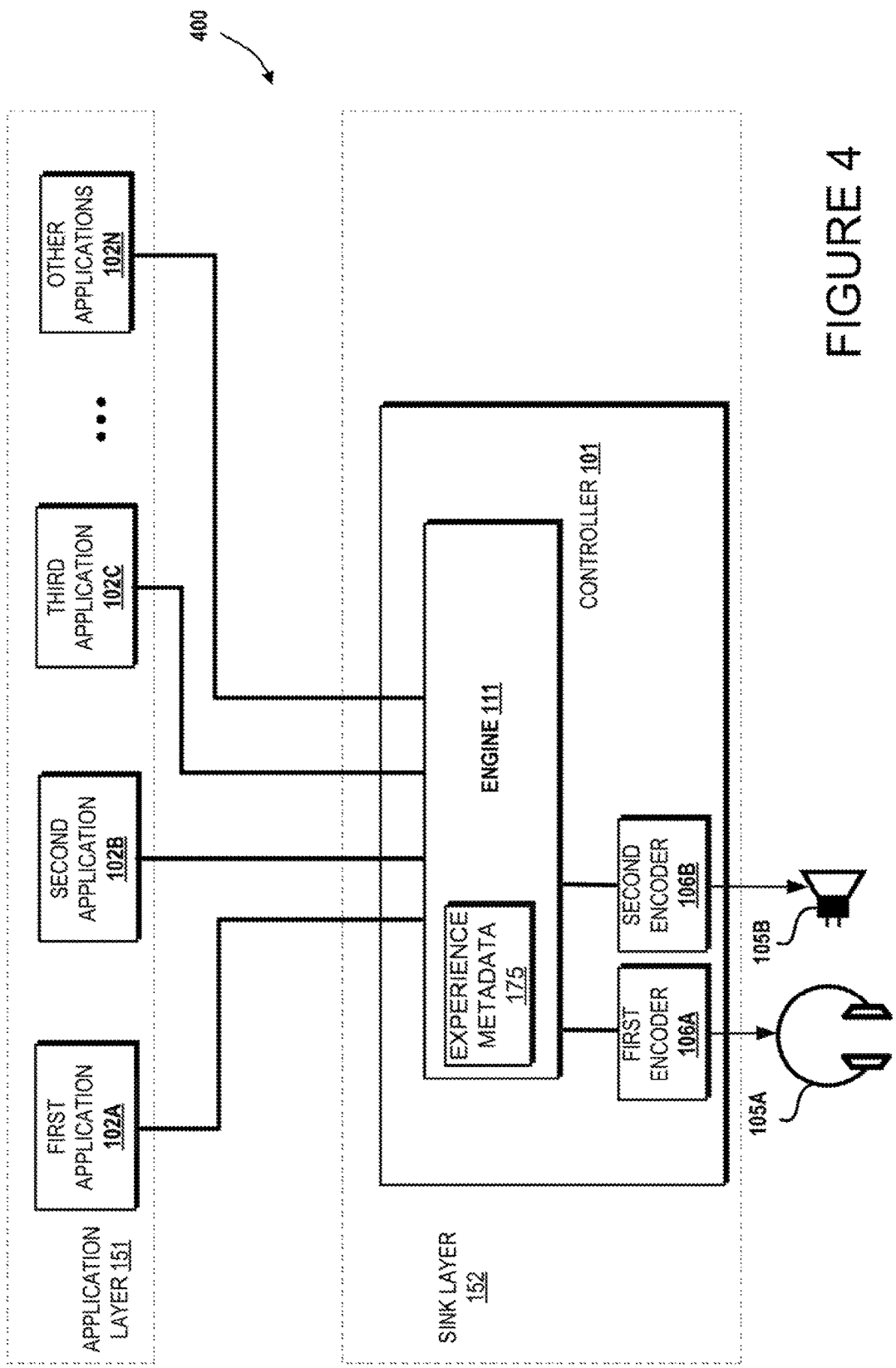
FIG. 4 illustrates an example system for streaming of spatial audio.

Turning to FIG. 4, a system for streaming of spatial audio 400 is illustrated. The system 400 can simultaneously stream the audio to a user (e.g., using HRTF spatialization technology) via a first audio output device 105A and translate the stream into another spatialization form (e.g., Dolby Atmos) for the second audio output device 105B (e.g., a speaker system) for the other(s) to experience the augmented and/or virtual reality experience, as discussed above. For example, a user can indicate that only audio of an augmented and/or virtual reality experience is to be shared with other(s) via experience metadata 175.

Figure 5:
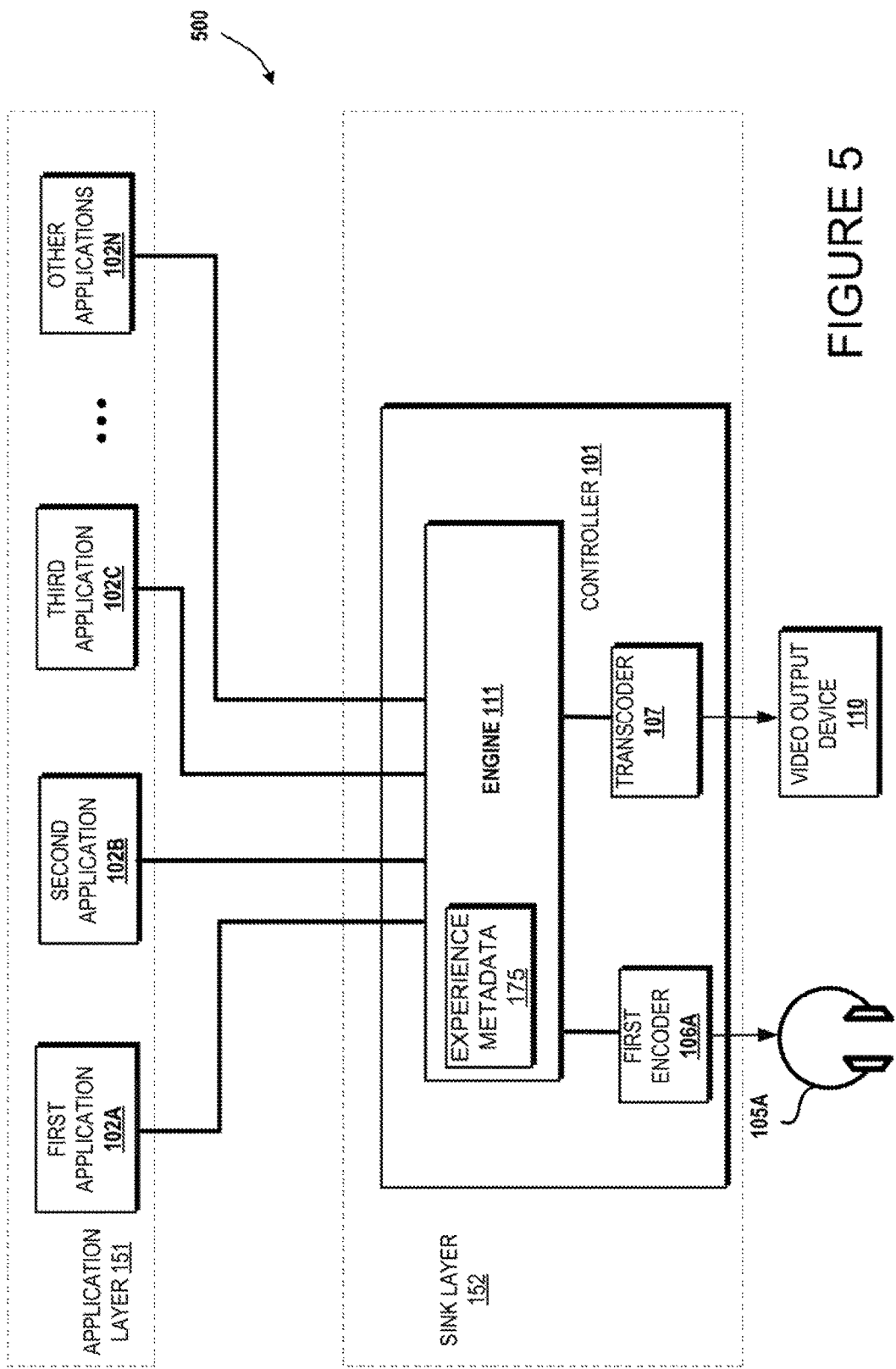
FIG. 5 illustrates an example system for streaming of spatial audio and video.

Referring to FIG. 5, a system for streaming of spatial audio and video 500 is illustrated. The system 500 can simultaneously stream virtual reality video to a user via a headset and transcode the virtual reality video to a 360 degree video stream using the transcoder 107. The transcoder 107 can then provide a 360 degree video stream to the video output device 110 (e.g., television, display, etc.) for the other(s) to experience the augmented and/or virtual reality session, as discussed previously. For example, a user can indicate that only video of an augmented and/or virtual reality experience is to be shared with other(s) via experience metadata 175.

Figure 6:
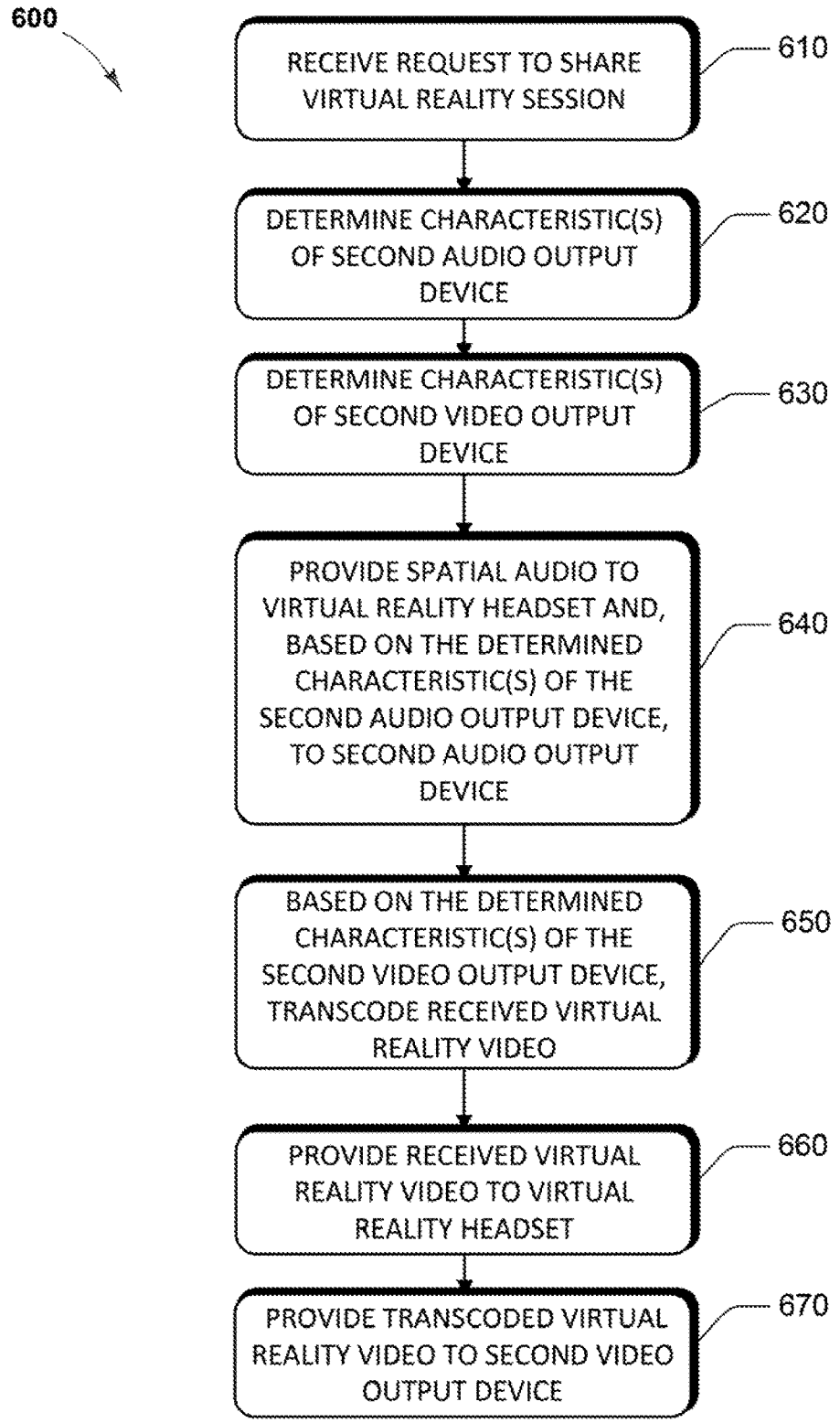
FIG. 6 illustrates an exemplary method of streaming spatial audio and video.
Figure 7:
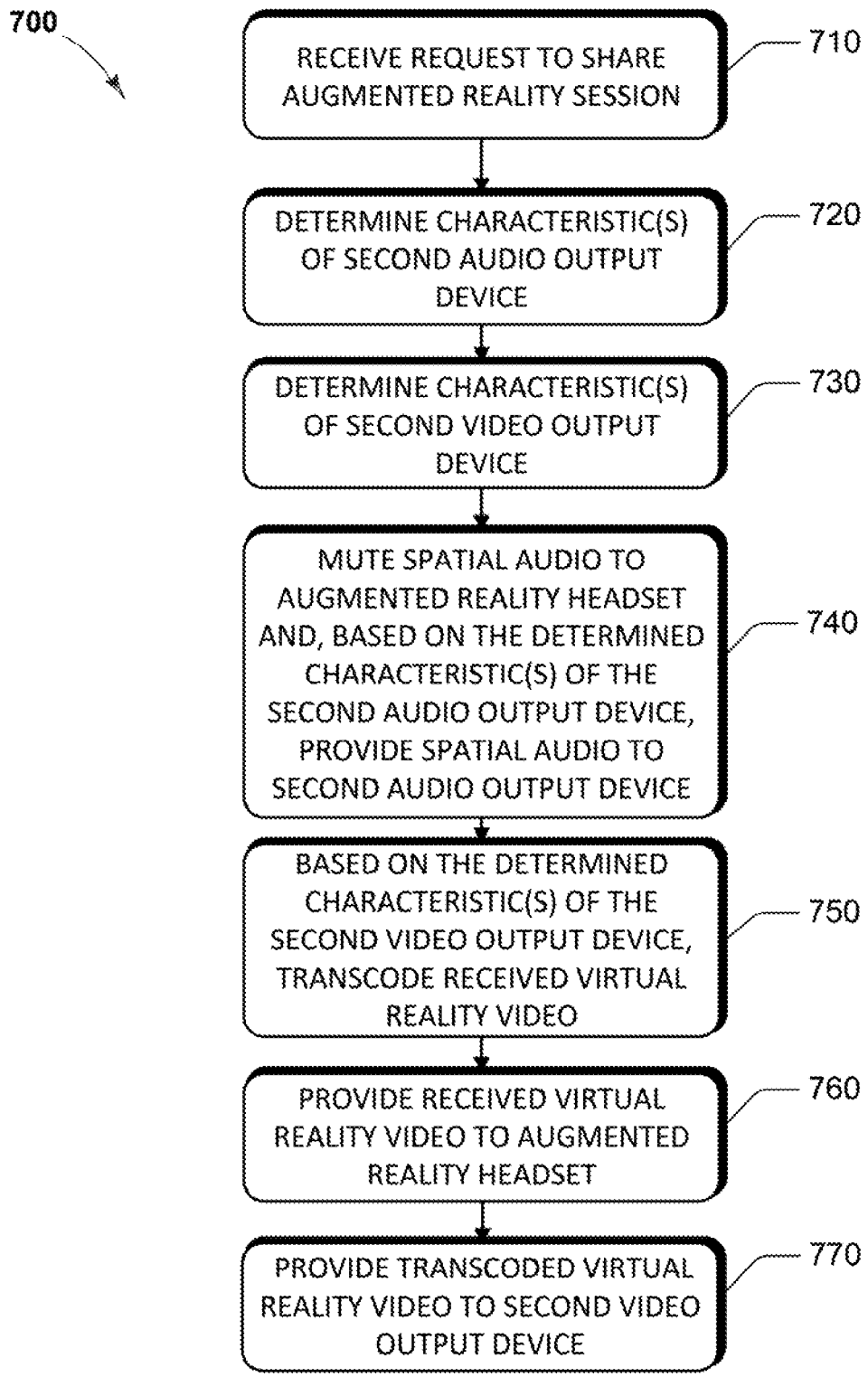
FIG. 7 illustrates an exemplary method of streaming spatial audio and video.
Figure 8:
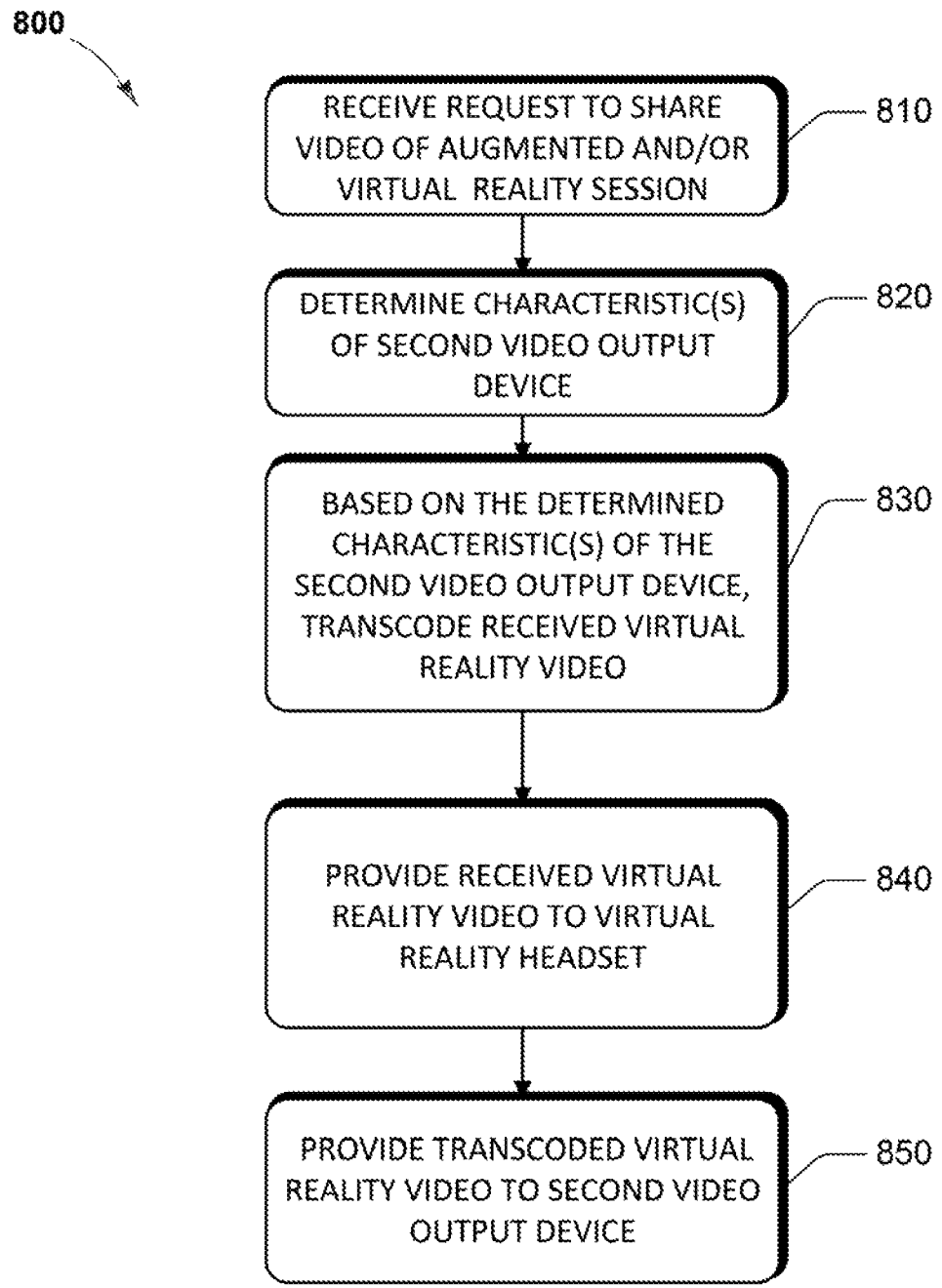
FIG. 8 illustrates an exemplary method of streaming spatial video.

Turning now to FIGS. 6-8, aspects of methods (e.g., routines) for streaming of spatial audio and/or video are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of methods 600, 700, 800 are described herein as being implemented, at least in part, by an application, component and/or circuit, such as the controller 101. In some configurations, the controller 101 can be a dynamically linked library (DLL), a statically linked library, functionality produced by an application programing interface (API), a compiled program, an interpreted program, a script or any other executable set of instructions. Data and/or modules, engine 111, can be stored in a data structure in one or more memory components. Data can be retrieved from the data structure by addressing links or references to the data structure.

Although the following illustration refers to the components of FIGS. 1, 4 and 5, it can be appreciated that the operations of the methods 600, 700, 800 may be also implemented in many other ways. For example, the methods 600, 700, 800 may be implemented, at least in part, by a processor of another remote computer or a local circuit. In addition, one or more of the operations of the methods 600, 700, 800 may alternatively or additionally be implemented, at least in part, by a chipset working alone or in conjunction with other software modules. Any service, circuit or application suitable for providing the techniques disclosed herein can be used in operations described herein.

With reference to FIG. 6, a method of streaming spatial audio and video 600 is illustrated. At 610, a request to share a virtual reality session is received. For example, the request can be initiated by a user associated with the virtual reality session.

At 620, characteristic(s) of a second audio output device are determined. The characteristic(s) can include, for example, a quantity and location of speaker(s) and/or an associated audio spatialization technology (e.g., object-based, Ambisonics, channel-based, etc.)

At 630, characteristic(s) of a second video output device are determined. The characteristic(s) can include a physical size, input type (e.g., VGA, HDMI, Wi-Fi, wired LAN, etc.) and/or a pixel count associated with the second video output device.

At 640, spatial audio is provided to a virtual reality headset and, based on the determined characteristic(s) of the second audio output device, to the second audio output device. At 650, received virtual reality video is transcoded based on the determined characteristic(s) of the second video output device.

At 660, the received virtual reality video is provided to the virtual reality head set. At 670, the transcoded virtual reality video is provided to the second video output device.

Turning to FIG. 7, a method of streaming spatial audio and video 700 is illustrated. At 710, a request to share an augmented reality session is received (e.g., initiated by a user associated with the augmented reality session). An augmented reality head set supplements the user's real-world environment with projected computer-generated image(s) and audio. The user continues to be able to see and/or hear object(s) within his real-world environment. Accordingly, in one embodiment, when sharing of audio in an augmented reality session, an audio feed to the augmented head set is muted with the user experiencing audio from an audio output device (e.g., speaker(s)) shared with other(s).

At 720, characteristic(s) of a second audio output device are determined (e.g., a quantity of speaker(s), location of speaker(s), or an associated audio spatialization technology, etc.) At 730, characteristic(s) of a second video output device are determined (e.g., a physical size, input type, a pixel count, etc.) At 740, spatial audio of a virtual reality headset is muted and, based on the determined characteristic(s) of the second audio output device, spatial audio is provided to the second audio output device.

At 750, received virtual reality video is transcoded based on the determined characteristic(s) of the second video output device. At 760, the received virtual reality video is provided to the augmented reality head set. At 770, the transcoded virtual reality video is provided to the second video output device.

Referring to FIG. 8, a method of streaming spatial video 800 is illustrated. At 810, a request to share video of an augmented and/or virtual reality session is received. At 820, characteristic(s) of a second video output device are determined.

At 830, a received virtual reality video is transcoded based on the determined characteristic(s) of the second video output device. At 840, the received virtual reality video is provided to the virtual reality head set. At 850, the transcoded virtual reality video is provided to the second video output device.

Described herein is a system for streaming spatial audio and video, comprising a processor; a computer-readable storage medium in communication with the processor, the computer-readable storage medium having computer-executable instructions stored thereupon which, when executed by the processor, cause the processor to: receive a request to share a virtual reality session; determine a characteristic of a second audio output device; determine a characteristic of a second video output device; in response to the request, based on the determined characteristic of the second audio output device, provide spatial audio to the second audio output device; in response to the request, transcode received virtual reality video based on the determined characteristic of the second video output device; and provide the transcoded virtual reality video to the second video output device.

The computer-readable storage medium can have further computer-executable instructions stored thereupon which, when executed by the processor, cause the processor to provide spatial audio to a virtual reality headset. The system can further include wherein the spatial audio provided to the second audio output device is three-dimensional audio data using a higher-order spherical sound representation.

The system can include wherein the spatial audio provided to the second audio output device is three-dimensional audio data using a mixed-order spherical sound representation. The system can further include wherein the spatial audio provided to the second audio output device is three-dimensional audio data using an object-based audio output. The system can include wherein the spatial audio provided to the second audio output device is three-dimensional audio data using an object-based audio output utilizing at least one of a folded or a co-located audio object.

The system can include wherein the characteristic of the second audio output device comprises at least one of a quantity of speakers, a location of speakers or an associated audio spatialization technology. The system can further include wherein the transcoded virtual reality video provided to the second video output device comprises a 360 degree video stream. The system can include wherein the request to share the virtual reality session is received via experience metadata.

Described herein is a method of streaming spatial audio and video, comprising: receiving a request to share an augmented reality session; determine a characteristic of a second audio output device; determine a characteristic of a second video output device; in response to the request, based on the determined characteristic of the second audio output device, provide spatial audio to the second audio output device; in response to the request, muting spatial audio provided to an augmented reality headset associated with the augmented reality session; in response to the request, transcode received augmented reality video based on the determined characteristic of the second video output device; and provide the transcoded augmented reality video to the second video output device.

The method can include wherein the spatial audio provided to the second audio output device is three-dimensional audio data using a higher-order spherical sound representation. The method can further include wherein the spatial audio provided to the second audio output device is three-dimensional audio data using a mixed-order spherical sound representation. The method can include wherein the spatial audio provided to the second audio output device is three-dimensional audio data using an object-based audio output.

The method can include wherein the characteristic of the second audio output device comprises at least one of a quantity of speakers, a location of speakers or an associated audio spatialization technology. The method can further include wherein the transcoded augmented reality video provided to the second video output device comprises a 360 degree video stream.

Described herein is a computer-readable storage medium having computer-executable instructions stored thereupon which, when executed by one or more processors of a system, cause the one or more processors of the system to: receive a request to share a virtual reality session; determine a characteristic of a second audio output device; determine a characteristic of a second video output device; in response to the request, based on the determined characteristic of the second audio output device, provide spatial audio to the second audio output device; in response to the request, transcode received virtual reality video based on the determined characteristic of the second video output device; and provide the transcoded virtual reality video to the second video output device.

The computer-readable storage medium can have further computer-executable instructions stored thereupon which, when executed by the processor, cause the processor to provide spatial audio to a virtual reality headset. The computer-readable storage medium can further include wherein the spatial audio provided to the second audio output device is three-dimensional audio data using a higher-order spherical sound representation.

The computer-readable storage medium can further include wherein the spatial audio provided to the second audio output device is three-dimensional audio data using an object-based audio output. The computer-readable storage medium can further include wherein the spatial audio provided to the second audio output device is three-dimensional audio data using an object-based audio output utilizing at least one of a folded or a co-located audio object.

Figure 9:
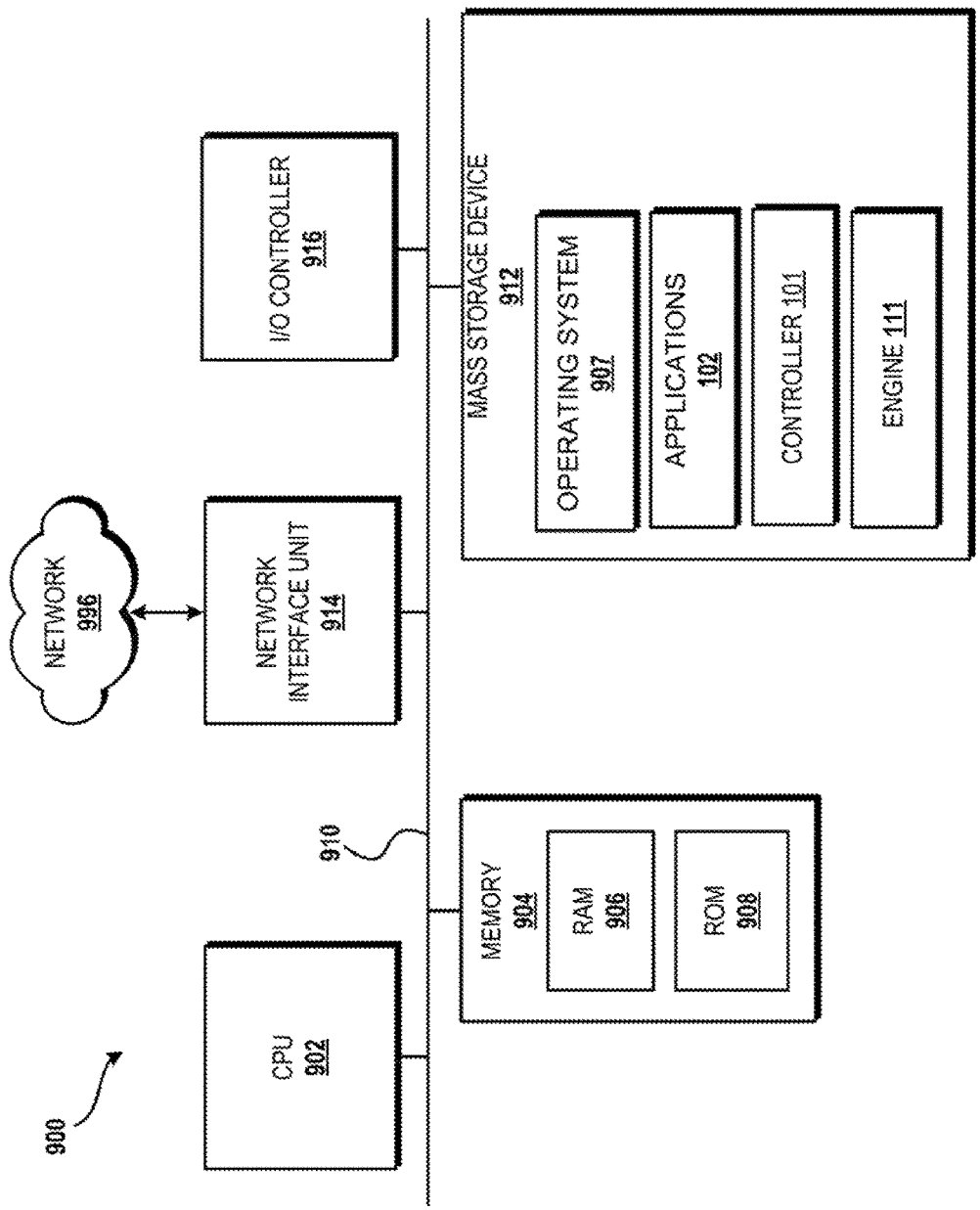
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a computer, such as the controller 101 (FIG. 1), capable of executing the program components described herein. Thus, the computer architecture 900 illustrated in FIG. 9 illustrates an architecture for a server computer, mobile phone, a PDA, a smart phone, a desktop computer, a netbook computer, a tablet computer, and/or a laptop computer. The computer architecture 900 may be utilized to execute any aspects of the software components presented herein.

The computer architecture 900 illustrated in FIG. 9 includes a central processing unit 902 ("CPU"), a system memory 904, including a random access memory 906 ("RAM") and a read-only memory ("ROM") 908, and a system bus 910 that couples the memory 904 to the CPU 902. A basic input/output system containing the basic routines that help to transfer information between elements within the computer architecture 900, such as during startup, is stored in the ROM 908. The computer architecture 900 further includes a mass storage device 912 for storing an operating system 907, one or more applications 102, the controller 101, the engine 111, and other data and/or modules.

The mass storage device 912 is connected to the CPU 902 through a mass storage controller (not shown) connected to the bus 910. The mass storage device 912 and its associated computer-readable media provide non-volatile storage for the computer architecture 900. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage medium," "computer-readable storage medium" and variations thereof, does not include waves, signals, and/or other transitory and/or intangible communication media, per se.

According to various configurations, the computer architecture 900 may operate in a networked environment using logical connections to remote computers through the network 956 and/or another network (not shown). The computer architecture 900 may connect to the network 956 through a network interface unit 914 connected to the bus 910. It should be appreciated that the network interface unit 914 also may be utilized to connect to other types of networks and remote computer systems. The computer architecture 900 also may include an input/output controller 916 for receiving and processing input from a number of other devices, including a keyboard, mouse, or electronic stylus (not shown in FIG. 9). Similarly, the input/output controller 916 may provide output to a display screen, a printer, or other type of output device (also not shown in FIG. 9).

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 900 in order to store and execute the software components presented herein. It also should be appreciated that the computer architecture 900 may include other types of computing devices, including hand-held computers, embedded computer systems, personal digital assistants, and other types of computing devices known to those skilled in the art. It is also contemplated that the computer architecture 900 may not include all of the components shown in FIG. 9, may include other components that are not explicitly shown in FIG. 9, or may utilize an architecture completely different than that shown in FIG. 9.

Conclusion

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for streaming spatial audio and video, comprising:
   a processor;
   a computer-readable storage medium in communication with the processor, the computer-readable storage medium having computer-executable instructions stored thereupon which, when executed by the processor, cause the processor to:
   while a virtual reality session is being rendered to a user via a first audio output device and a first video output device, receive a request from the user to share the virtual reality session with another user, the virtual reality session comprising virtual reality video and spatial audio using a first audio spatialization technology comprising one of a higher-order spherical sound representation, a mixed-order spherical sound representation, or an object-based audio output utilizing at least one of a folded or a co-located audio object;
   determine a characteristic of a second audio output device, the characteristic comprising an associated audio spatialization technology comprising one of a higher-order spherical sound representation, a mixed-order spherical sound representation, or an object-based audio output utilizing at least one of a folded or a co-located audio object;
   determine a characteristic of a second video output device, the characteristics comprising an input type;
   in response to the request to share the virtual reality session with another user, based on the determined characteristic of the second audio output device, simultaneously provide spatial audio to the first audio output device and the second audio output device, the spatial audio provided to the second audio output device using a different audio spatialization technology than the spatial audio provided to the first audio output device;
   in response to the request to share the virtual reality session with another user, transcode received virtual reality video based on the determined characteristic of the second video output device; and
   provide the transcoded virtual reality video to the second video output device.

2. The system of claim 1, the computer-readable storage medium having further computer-executable instructions stored thereupon which, when executed by the processor, cause the processor to provide spatial audio to a virtual reality headset.

3. The system of claim 1, wherein the characteristic of the second audio output device further comprises at least one of a quantity of speakers or a location of speakers.

4. The system of claim 1, wherein the transcoded virtual reality video provided to the second video output device comprises a 360 degree video stream.

5. The system of claim 1, wherein the request to share the virtual reality session is received via experience metadata.

6. A method of streaming spatial audio and video, comprising:
   while an augmented reality session is being rendered to a user via a first audio output device and a first video output device, receive a request from the user to share the virtual reality session with another user, the augmented reality session comprising virtual reality video and spatial audio using a first audio spatialization technology comprising one of a higher-order spherical sound representation, a mixed-order spherical sound representation, or an object-based audio output utilizing at least one of a folded or a co-located audio object;
   determine a characteristic of a second audio output device, the characteristic comprising an associated audio spatialization technology comprising one of a higher-order spherical sound representation, a mixed-order spherical sound representation, or an object-based audio output utilizing at least one of a folded or a co-located audio object;
   determine a characteristic of a second video output device, the characteristics comprising an input type;
   in response to the request to share the augmented reality session with another user, based on the determined characteristic of the second audio output device, provide spatial audio to the second audio output device, the spatial audio provided to the second audio output device using a different audio spatialization technology than the spatial audio provided to the first audio output device;
   in response to the request to share the augmented reality session with another user, muting spatial audio provided to an augmented reality headset associated with the augmented reality session;
   in response to the request, transcode received augmented reality video based on the determined characteristic of the second video output device; and
   provide the transcoded augmented reality video to the second video output device.

7. The method of claim 6, wherein the characteristic of the second audio output device comprises at least one of a quantity of speakers, a location of speakers or an associated audio spatialization technology.

8. The method of claim 6, wherein the transcoded augmented reality video provided to the second video output device comprises a 360 degree video stream.

9. A computer-readable storage medium having computer-executable instructions stored thereupon which, when executed by one or more processors of a system, cause the one or more processors of the system to:
   while a virtual reality session is being rendered to a user via a first audio output device and a first video output device, receive a request from the user to share the virtual reality session with another user, the virtual reality session comprising virtual reality video and spatial audio using a first audio spatialization technology comprising one of a higher-order spherical sound representation, a mixed-order spherical sound representation, or an object-based audio output utilizing at least one of a folded or a co-located audio object;
   determine a characteristic of a second audio output device, the characteristic comprising an associated audio spatialization technology comprising one of a higher-order spherical sound representation, a mixed-order spherical sound representation, or an object-based audio output utilizing at least one of a folded or a co-located audio object;
   determine a characteristic of a second video output device, the characteristics comprising an input type;
   in response to the request to share the virtual reality session with another user, based on the determined characteristic of the second audio output device, simultaneously provide spatial audio to the first audio output device and the second audio output device, the spatial audio provided to the second audio output device using a different audio spatialization technology than the spatial audio provided to the first audio output device;

in response to the request to share the virtual reality session with another user, transcode received virtual reality video based on the determined characteristic of the second video output device; and provide the transcoded virtual reality video to the second video output device.

10. The computer-readable storage medium of claim 9 having further computer-executable instructions stored thereupon which, when executed by the processor, cause the processor to provide spatial audio to a virtual reality headset.

* * * * *